US009564834B1

(12) United States Patent
Chen et al.

(10) Patent No.: US 9,564,834 B1
(45) Date of Patent: Feb. 7, 2017

(54) ALTERNATING CURRENT TO DIRECT CURRENT CONVERTER SYSTEM

(71) Applicant: HON HAI PRECISION INDUSTRY CO., LTD., New Taipei (TW)

(72) Inventors: Che-Hsun Chen, New Taipei (TW); Chuang-Wei Tseng, New Taipei (TW); Yu-Ching Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1 day.

(21) Appl. No.: 14/810,100

(22) Filed: Jul. 27, 2015

(51) Int. Cl.
*H02M 7/217* (2006.01)
*H02M 7/537* (2006.01)

(52) U.S. Cl.
CPC ................... *H02M 7/537* (2013.01)

(58) Field of Classification Search
CPC ........ H02M 1/4208; H02M 7/00; H02M 7/04; H02M 7/217
USPC ..................... 363/84, 89, 125, 127
See application file for complete search history.

(56) References Cited

U.S. PATENT DOCUMENTS

| 3,808,512 | A  | * | 4/1974 | Sakka ..................... H02M 7/17 363/62 |
| 8,638,578 | B2 | * | 1/2014 | Zhang ................. H02M 1/4225 323/228 |
| 9,332,602 | B2 | * | 5/2016 | Roberts .............. H05B 33/0815 |
| 2015/0173139 | A1 | * | 6/2015 | Roberts .............. H05B 33/0815 315/193 |
| 2015/0188362 | A1 | * | 7/2015 | Mondal ................. H02M 3/156 307/52 |

\* cited by examiner

*Primary Examiner* — Adolf Berhane
(74) *Attorney, Agent, or Firm* — Zhigang Ma

(57) ABSTRACT

An alternating current to direct current converter system includes an alternating current power supply, an external electronic load, a first MOS transistor, a first control module, a first switch and a second control module. The alternating current power supply includes a first output end and a second output end. The first control module controls the first MOS transistor to active when the first output end has a positive voltage and control the first MOS transistor to turn off when the second output end has a positive voltage. The first switch connects to a first end of the external electronic load and the second output end. The second control module connects to the first switch. The second control module controls the first switch to active when the second output end has a positive voltage and controls the switch to turn off when the first output end has a positive voltage.

20 Claims, 1 Drawing Sheet

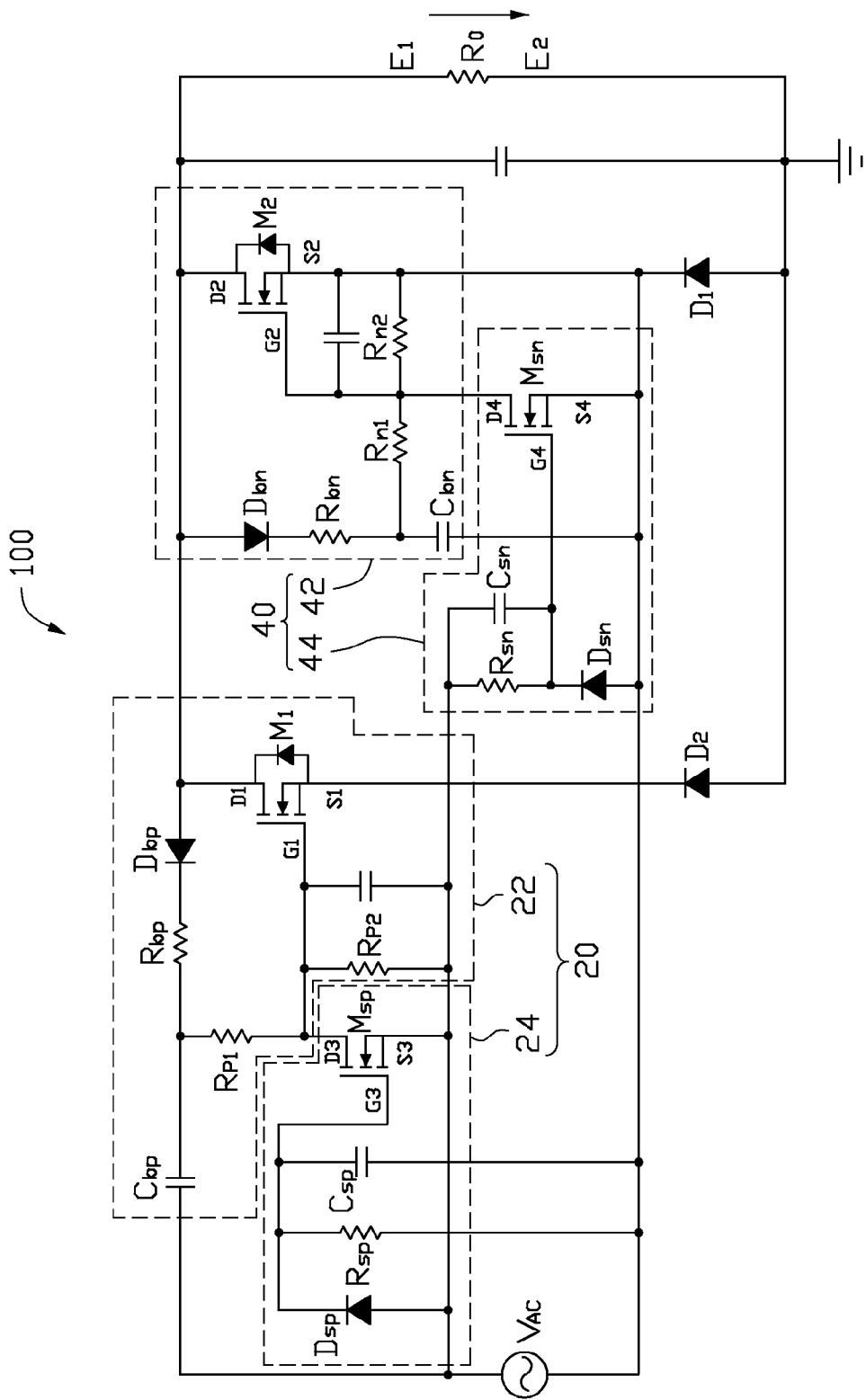

ALTERNATING CURRENT TO DIRECT CURRENT CONVERTER SYSTEM

FIELD

The subject matter herein generally relates to an alternating current to direct current converter system.

BACKGROUND

Alternating current to direct current converter systems generally includes a plurality of diodes and microcontrollers to control direction of current. When the current flows the diode, a part of electronic energy is lost.

BRIEF DESCRIPTION OF THE DRAWINGS

Implementations of the present technology will now be described, by way of example only, with reference to the attached FIGURE.

The FIGURE is a circuit diagram of an alternating current to direct current converter system according to an exemplary embodiment.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A definition that apply throughout this disclosure will now be presented.

The term "comprising" means "including, but not necessarily limited to"; it specifically indicates open-ended inclusion or membership in a so-described combination, group, series, and the like.

The FIGURE illustrates an alternating current to direct current converter system 100 including an alternating current power supply $V_{AC}$, a first MOS transistor M1, a first control module 20, a second MOS transistor M2, a second control module 40, a first diode D1, a second diode D2 and an external electronic load R0. The alternating current power supply $V_{AC}$ configured to provide an alternating current. The alternating current to direct current converter system 100 is configured to convert the alternating current to a direct current to load on the external electronic load R0.

The first MOS transistor M1 includes a gate electrode G1, a drain electrode D1 and a source electrode S1. The gate electrode G1 of the first MOS transistor M1 connects to the first control module 20. The drain electrode D1 of the first MOS transistor M1 connects to a first output end of the alternating current power supply $V_{AC}$. The source electrode S1 of the first MOS transistor M1 connects to a first end E1 of the external electronic load R0. A second end E2 of the external electronic load R0 connects to the second output end of the alternating current power supply $V_{AC}$ through the first diode D1. The first control module 20 is configured to connect the drain electrode D1 of the first MOS transistor M1 to the source electrode S1 of the first MOS transistor M1 when the first output end of the alternating current power supply $V_{AC}$ outputs positive voltage and disconnect the drain electrode D1 of the first MOS transistor M1 to the source electrode S1 of the first MOS transistor M1 when the second output end of the alternating current power supply $V_{AC}$ outputs positive voltage.

The gate electrode G2 of the second MOS transistor M2 connects to the second control module 40. The drain electrode D2 of the second MOS transistor M2 connects to a second output end of the alternating current power supply $V_{AC}$. The source electrode S2 of the second MOS transistor M2 connects to the first end E1 of the external electronic load R0. The second end E2 of the external electronic load R0 further connects to the first output end of the alternating current power supply $V_{AC}$ through the second diode D2. The second control module 40 is configured to connect the drain electrode D2 of the second MOS transistor M2 to the source electrode S2 of the second transistor M2 when the second output end of the alternating current power supply $V_{AC}$ outputs positive voltage and disconnect the drain electrode D2 of the second MOS transistor M2 to the source electrode S2 of the second MOS transistor M2 when the first output end of the alternating current power supply $V_{AC}$ outputs positive voltage.

When the alternating current power supply $V_{AC}$ in a first half cycle, the first output end of the alternating current power supply $V_{AC}$ outputs positive voltage, the drain electrode D1 of the first MOS transistor M1 connects to the source electrode S1 of the first MOS transistor M1 and the drain electrode D2 of the second MOS transistor M2 disconnects to the source electrode S2 of the second transistor M2. Thus, the current flows from first output end of the alternating current power supply $V_{AC}$ to second output end of the alternating current power supply $V_{AC}$ through the first MOS transistor M1, the first end E1 of the external electronic load R0, the second end E2 of the external electronic load R0 and the first diode D1 in turn. Thus, when the first output end of the alternating current power supply $V_{AC}$ outputs positive voltage, the current can flows from the first end E1 of the external electronic load R0 to the second end E2 of the external electronic load R0. When the alternating current power supply $V_{AC}$ in a second half cycle, the second output end of the alternating current power supply $V_{AC}$ outputs positive voltage, the drain electrode D2 of the second MOS transistor M2 connects to the source electrode S2 of the second MOS transistor M2 and the drain electrode D1 of the first MOS transistor M1 disconnects to the source electrode S1 of the first transistor M1. Thus, the current flows from second output end of the alternating current power supply $V_{AC}$ to first output end of the alternating current power supply $V_{AC}$ through the second MOS transistor M2, the first end E1 of the external electronic load R0, the second end E2 of the external electronic load R0 and the second diode D2 in turn. Thus, when the second output end of the alternating current power supply $V_{AC}$ outputs positive voltage, the current also can flows from the first end E1 of the external electronic load R0 to the second end E2 of the external electronic load R0.

The first control module 20 includes a first charge and discharge module 22 and a second charge and discharge module 24. The first charge and discharge module 22 connects the first MOS transistor M1 and the second MOS transistor M2. When the second output end of the alternating current power supply $V_{AC}$ outputs positive voltage, the first charge and discharge module 22 is configured to be charged by the current from the second MOS transistor M2. When the first output end of the alternating current power supply $V_{AC}$ outputs positive voltage, the first charge and discharge module 22 is configured to discharge to make the voltage of the gate electrode G1 of the first MOS transistor M1 higher than the voltage of the source electrode S1 of the first MOS transistor M1 to connect the drain electrode D1 of the first MOS transistor M1 to the source electrode S1 of the first MOS transistor M1.

The second charge and discharge module 24 connects to the first charge and discharge module 22 and the alternating current power supply $V_{AC}$. When the first output end of the alternating current power supply $V_{AC}$ outputs positive voltage, the second charge and discharge module 24 is configured to be charged by the current from the first output end of the alternating current power supply $V_{AC}$. When the second output end of the alternating current power supply $V_{AC}$ outputs positive voltage, the second charge and discharge module 24 is configured to discharge to connect the first charge and discharge module 22 to make the voltage of the gate electrode G1 of the first MOS transistor M1 equal to the voltage of the source electrode S1 of the first MOS transistor M1 to disconnect the drain electrode D1 of the first MOS transistor M1 to the source electrode S1 of the first MOS transistor M1.

The first charge and discharge module 22 includes a first capacitance Cbp, a first resistance Rp1 and a second resistance Rp2. A first end of the first capacitance Cbp connects to the drain electrode D2 of the second MOS transistor M2 and a first end of the first resistance Rp1. A first end of the second resistance Rp2 connects to the second end of the first resistance Rp1 and the gate electrode G1 of the first MOS transistor M1. A second end of the second resistance Rp2 connects to the second end of the first capacitance Cbp and the source electrode S1 of the first MOS transistor M1. A third resistance Rbp and a third diode Dbp connect between the first end of the first capacitance Cbp and the drain electrode D2 of the second MOS transistor M2.

The second charge and discharge module 24 includes a second capacitance Csp, a fourth resistance Rsp and a third MOS transistor Msp. The first end of the second capacitance Csp connects to a first end of the fourth resistance Rsp, the first output end of the alternating current power supply $V_{AC}$ and the gate electrode G3 of the third MOS transistor Msp. The drain electrode D3 of the third MOS transistor Msp connects to the first end of the second resistance Rp2. The source electrode S3 of the third MOS transistor Msp connects to the second end of the second resistance Rp2. The second end of the second capacitance Csp connects to the second output end of the alternating current power supply $V_{AC}$. A second end of the fourth resistance Rsp connects to second output end of the alternating current power supply $V_{AC}$. A fourth diode Dsp connects between the first output end of the alternating current power supply $V_{AC}$ and the first end of the second capacitance Csp.

The second control module 40 includes a third charge and discharge module 42 and a fourth charge and discharge module 44. The third charge and discharge module 42 connects the first MOS transistor M1 and the second MOS transistor M2. When the first output end of the alternating current power supply $V_{AC}$ outputs positive voltage, the third charge and discharge module 42 is configured to be charged by the current from the first MOS transistor M1. When the second output end of the alternating current power supply $V_{AC}$ outputs positive voltage, the third charge and discharge module 42 is configured to discharge to the second MOS transistor M2 to make the voltage of the gate electrode G2 of the second MOS transistor M2 higher than the voltage of the source electrode S2 of the second MOS transistor M2 to connect the drain electrode D2 of the second MOS transistor M2 to the source electrode S2 of the second MOS transistor M2.

The fourth charge and discharge module 44 connects to the third charge and discharge module 42 and the alternating current power supply $V_{AC}$. When the second output end of the alternating current power supply $V_{AC}$ outputs positive voltage, the fourth charge and discharge module 44 is configured to be charged by the current from the second output end of the alternating current power supply $V_{AC}$. When the first output end of the alternating current power supply $V_{AC}$ outputs positive voltage, the fourth charge and discharge module 44 is configured to discharge to make the voltage of the gate electrode G2 of the second MOS transistor M2 equal to the voltage of the source electrode S2 of the second MOS transistor M2 to disconnect the drain electrode D2 of the second MOS transistor M2 to the source electrode S2 of the second MOS transistor M2.

The third charge and discharge module 42 includes a third capacitance Cbn, a fifth resistance Rn1 and a sixth resistance Rn2. A first end of the third capacitance Cbn connects to the drain electrode D1 of the first MOS transistor M1 and a first end of the fifth resistance Rn1. A first end of the sixth resistance Rn2 connects to the second end of the fifth resistance Rn1 and the gate electrode G2 of the second MOS transistor M2. A second end of the sixth resistance Rn2 connects to the second end of the third capacitance Cbn and the source electrode S2 of the second MOS transistor M2. A seventh resistance Rbn and a fifth diode Dbp connect between the first end of the third capacitance Cbn and the drain electrode D1 of the first MOS transistor M1.

The fourth charge and discharge module 44 includes a fourth capacitance Csn, an eighth resistance Rsn and a fourth MOS transistor Msn. The first end of the fourth capacitance Csn connects to a first end of the eighth resistance Rsn, the second output end of the alternating current power supply $V_{AC}$ and the gate electrode G4 of the fourth MOS transistor Msn. The drain electrode D4 of the fourth MOS transistor Msn connects to the first end of the sixth resistance Rn2. The source electrode S4 of the fourth MOS transistor Msn connects to the second end of the sixth resistance Rn2. The second end of the fourth capacitance Csn connects to the first output end of the alternating current power supply $V_{AC}$. A second end of the eighth resistance Rsn connects to second output end of the alternating current power supply $V_{AC}$. A sixth diode Dsn connects between the second output end of the alternating current power supply $V_{AC}$ and the first end of the fourth capacitance Csn.

When the second output end of the alternating current power supply $V_{AC}$ outputs positive voltage, the current flows through the second MOS transistor M2 to charge the first capacitance Cbp. When the first output end of the alternating current power supply $V_{AC}$ outputs positive voltage, the first capacitance Cbp discharges to form a current through the first resistance Rp1 and the second resistance Rp2. The first end of the second resistance Rp2 and second end of the second resistance Rp2 respectively connect the gate electrode G1 of the first MOS transistor M1 and the source electrode S1 of the first MOS transistor M1. Thus, the voltage of the gate electrode G1 of the first MOS transistor M1 is higher than the voltage of the source electrode S1 of the first MOS transistor M1 to make the source electrode S1 of the first MOS transistor M1 connect to the drain electrode D1 of the first MOS transistor M1. Therefore, when first output end of the alternating current power supply $V_{AC}$ outputs positive voltage, the current from the first output end of the alternating current power supply $V_{AC}$ can flow the first MOS transistor M1 and the third capacitance Cbn is charged by the current from the first MOS transistor M1. When the first output end of the alternating current power supply $V_{AC}$ outputs positive voltage, the second capacitance Csp is also charged by the current from the first output end of the alternating current power supply $V_{AC}$.

When the second output end of the alternating current power supply $V_{AC}$ outputs positive voltage, the second capacitance Csp discharges to form a current through the fourth resistance Rsp. The first end of the fourth resistance Rsp and second end of the fourth resistance Rsp respectively connect the gate electrode G3 of the third MOS transistor Msp and the source electrode S3 of the third MOS transistor Msp. Thus, the voltage of the gate electrode G3 of the third MOS transistor Msp is higher than the voltage of the source electrode S3 of the third MOS transistor Msp to make the source electrode S3 of the third MOS transistor Msp connect to the drain electrode D3 of the third MOS transistor M3. Because the drain electrode D3 of the third MOS transistor Msp connects to the first end of the second resistance Rp2 and the source electrode S3 of the third MOS transistor Msp connects to the second end of the second resistance Rp2, the voltage between two ends of the second resistance Rp2 is zero when the source electrode S3 of the third MOS transistor Msp connect to the drain electrode D3 of the third MOS transistor M3. The two ends of the second resistance Rp2 connect to the gate electrode G1 of the first MOS transistor M1 and the source electrode S1 of the first MOS transistor M1. Therefore, when the second output end of the alternating current power supply outputs positive voltage, the voltage of the gate electrode G1 of the first MOS transistor M1 is equal to the source electrode S1 of the first MOS transistor M1 to disconnect the drain electrode D1 of the first MOS transistor M1 and the source electrode S1 of the first MOS transistor M1.

When the first output end of the alternating current power supply $V_{AC}$ outputs positive voltage, the third capacitance Cbn is charged. When the second output end of the alternating current power supply $V_{AC}$ outputs positive voltage, the third capacitance Cbn discharge to form a current through the fifth resistance Rn1 and the sixth resistance Rn2. The first end of the sixth resistance Rn2 and second end of the sixth resistance Rn2 respectively connect the gate electrode G2 of the second MOS transistor M2 and the source electrode S2 of the second MOS transistor M2. Thus, the voltage of the gate electrode G2 of the second MOS transistor M2 is higher than the voltage of the source electrode S2 of the second MOS transistor M2 to make the source electrode S2 of the second MOS transistor M2 connect to the drain electrode D2 of the second MOS transistor M2. Therefore, when second output end of the alternating current power supply $V_{AC}$ outputs positive voltage, the current from the second output end of the alternating current power supply $V_{AC}$ can flow the second MOS transistor M2 and the first capacitance Cbp is charged by the current from the second MOS transistor M2. When the second output end of the alternating current power supply $V_{AC}$ outputs positive voltage, the fourth capacitance Csn is also charged by the current from the second output end of the alternating current power supply $V_{AC}$.

When the first output end of the alternating current power supply $V_{AC}$ outputs positive voltage, the fourth capacitance Csn discharges to form a current through the eighth resistance Rsn. The first end of the eighth resistance Rsn and second end of the eighth resistance Rsn respectively connect the gate electrode G4 of the fourth MOS transistor Msn and the source electrode S4 of the fourth MOS transistor Msn. Thus, the voltage of the gate electrode G4 of the fourth MOS transistor Msn is higher than the voltage of the source electrode S4 of the fourth MOS transistor Msn to make the source electrode S4 of the fourth MOS transistor Msn connect to the drain electrode D4 of the fourth MOS transistor Msn. Because the drain electrode D4 of the fourth MOS transistor Msn connects to the first end of the sixth resistance Rn2 and the source electrode S4 of the fourth MOS transistor Msn connects to the second end of the sixth resistance Rn2, the voltage between two ends of the sixth resistance Rn2 is zero when the source electrode S4 of the fourth MOS transistor Msn connect to the drain electrode D4 of the fourth MOS transistor Msn. The two ends of the sixth resistance Rn2 connect to the gate electrode G2 of the second MOS transistor M2 and the source electrode S2 of the second MOS transistor M2. Therefore, when the first output end of the alternating current power supply $V_{AC}$ outputs positive voltage, the voltage of the gate electrode G2 of the second MOS transistor M2 is equal to the source electrode S2 of the second MOS transistor M2 to disconnect the drain electrode D2 of the second MOS transistor M2 and the source electrode S2 of the second MOS transistor M2.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. An alternating current to direct current converter system comprising:
   an alternating current power supply system comprising a first output end and a second output end;
   an external electronic load having a first end and a second end;
   a first MOS transistor having a drain electrode, a source electrode and a gate electrode, the drain electrode of the first MOS transistor connected to the first output end of the alternating current power supply, and the source electrode of the first MOS transistor connected to the first end of the external electronic load;
   a first control module connected to the gate electrode of the first MOS transistor and the source electrode of the first MOS transistor, the first control module configured to control the drain electrode of the first MOS transistor to connect the source electrode of the first MOS transistor in event the first output end of the alternating current power supply has a positive voltage with respect to the alternating current power supply in a first half cycle, and control the drain electrode of the first MOS transistor to disconnect the source electrode of the first MOS transistor in event the second output end of the alternating current power supply has a positive voltage with respect to the alternating current power supply in a second half cycle;
   a first switch connected to the first end of the external electronic load and the second output end of the alternating current power supply; and a second control module connected to the first switch, the second control module configured to control the first switch to activate in event the second output end of the alternating current power supply has a positive voltage with respect to the alternating current power supply in the second half cycle and control the switch to turn off in event the first output end of the alternating current power supply has a positive voltage with respect to the alternating current power supply in the first half cycle.

2. The alternating current to direct current converter system as claimed in claim 1, wherein the first control module further comprises a first charge and discharge module, when the second output end of the alternating current power supply outputs positive voltage, the first charge and discharge module is charged by the current from the first switch, when the first output end of the alternating current power supply outputs positive voltage, the first charge and discharge module discharges to make the voltage of the gate electrode of the first MOS transistor higher than the voltage of the source electrode of the first MOS transistor to connect the drain electrode of the first MOS transistor to the source electrode of the first MOS transistor.

3. The alternating current to direct current converter system as claimed in claim 2, wherein the first control module further comprises a second charge and discharge module, the second charge and discharge module connects to the first charge and discharge module and the alternating current power supply, when the first output end of the alternating current power supply outputs positive voltage, the second charge and discharge module is charged by the current from the first output end of the alternating current power supply, when the second output end of the alternating current power supply outputs positive voltage, the second charge and discharge module discharges to connect the first charge and discharge module to make the voltage of the gate electrode of the first MOS transistor equal to the voltage of the source electrode of the first MOS transistor to disconnect the drain electrode of the first MOS transistor to the source electrode of the first MOS transistor.

4. The alternating current to direct current converter system as claimed in claim 3, wherein the first charge and discharge module comprises a first capacitance, the first capacitance is charged by the current from the first switch when the second output end of the alternating current power supply outputs positive voltage.

5. The alternating current to direct current converter system as claimed in claim 4, wherein the first charge and discharge module further comprises a first resistance and a second resistance, a first end of the first capacitance connects to the drain electrode of the second MOS transistor and a first end of the first resistance, a first end of the second resistance connects to the second end of the first resistance and the gate electrode of the first MOS transistor, a second end of the second resistance connects to the second end of the first capacitance and the source electrode of the first MOS transistor.

6. The alternating current to direct current converter system as claimed in claim 5, wherein the first switch is a second MOS transistor.

7. The alternating current to direct current converter system as claimed in claim 6, wherein a drain electrode of the second MOS transistor connects to the second output end of the alternating current power supply, a source electrode of the second MOS transistor connects to the first end of the external electronic load.

8. The alternating current to direct current converter system as claimed in claim 7, wherein the second control module connects to a gate electrode of the second MOS transistor and the source electrode of the second MOS transistor, the second control module controls the drain electrode of the second MOS transistor to connect the source electrode of the second MOS transistor when the second output end of the alternating current power supply outputs positive voltage and controls the drain electrode of the second MOS transistor to disconnect the source electrode of the second MOS transistor when the first output end of the alternating current power supply outputs positive voltage.

9. The alternating current to direct current converter system as claimed in claim 8, wherein a third resistance connects between the first end of the first capacitance and the drain electrode of the second MOS transistor.

10. The alternating current to direct current converter system as claimed in claim 9, wherein the second charge and discharge module comprises a second capacitance, a fourth resistance and a third MOS transistor, the first end of the second capacitance connects to a first end of the fourth resistance, the first output end of the alternating current power supply of the alternating current power supply and the gate electrode of the third MOS transistor, the drain electrode of the third MOS transistor connects to the first end of the second resistance, the source electrode of the third MOS transistor connects to the second end of the second resistance, the second end of the second capacitance connects to the second output end of the alternating current power supply, a second end of the fourth resistance connects to second output end of the alternating current power supply.

11. An alternating current to direct current converter system comprising:
   an alternating current power supply comprising a first output end and a second output end;
   an external electronic load having a first end and a second end;
   a first MOS transistor having a drain electrode, a source electrode and a gate electrode, the drain electrode of the first MOS transistor connected to a first output end of the alternating current power supply, the source electrode of the first MOS transistor connected to the first end of the external electronic load;
   a first control module connected to the gate electrode of the first MOS transistor and the source electrode of the first MOS transistor, the first control module configured to control the drain electrode of the first MOS transistor to connect the source electrode of the first MOS transistor in even the first output end of the alternating current power supply has a positive voltage with respect to the alternating current power supply in a first half cycle and control the drain electrode of the first MOS transistor to disconnect the source electrode of the first MOS transistor in event the second output end of the alternating current power supply has a positive voltage with respect to the alternating current power supply in a second half cycle;
   a second MOS transistor, a drain electrode of the second MOS transistor connects to the second output end of the alternating current power supply, a source electrode of the second MOS transistor connects to the first end of the external electronic load; and
   a second control module connected to a gate electrode of the second MOS transistor and the source electrode of the second MOS transistor, the second control module configured to control the drain electrode of the second MOS transistor to connect the source electrode of the second MOS transistor in event the second output end of the alternating current power supply has a positive voltage with respect to the alternating current power supply in the second half cycle and control the drain electrode of the second MOS transistor to disconnect the source electrode of the second MOS transistor in event the first output end of the alternating current power supply has a positive voltage with respect to the alternating current power supply in the first half cycle.

12. The alternating current to direct current converter system as claimed in claim 11, wherein a first diode connects between the first MOS transistor and the external electronic load.

13. The alternating current to direct current converter system as claimed in claim 11, wherein a second diode connects between the second MOS transistor and the external electronic load.

14. The alternating current to direct current converter system as claimed in claim 11, wherein the first control module further comprises a first charge and discharge module, when the second output end of the alternating current power supply of the alternating current power supply outputs positive voltage, the first charge and discharge module is charged by the current from the second MOS transistor, when the first output end of the alternating current power supply of the alternating current power supply outputs positive voltage, the first charge and discharge module discharges to make the voltage of the gate electrode of the first MOS transistor higher than the voltage of the source electrode of the first MOS transistor to connect the drain electrode of the first MOS transistor to the source electrode of the first MOS transistor.

15. The alternating current to direct current converter system as claimed in claim 14, wherein the first control module further comprises a second charge and discharge module, the second charge and discharge module connects to the first charge and discharge module and the alternating current power supply, when the first output end of the alternating current power supply outputs positive voltage, the second charge and discharge module is charged by the current from the first output end of the alternating current power supply, when the second output end of the alternating current power supply outputs positive voltage, the second charge and discharge module discharges to connect the first charge and discharge module to make the voltage of the gate electrode of the first MOS transistor equal to the voltage of the source electrode of the first MOS transistor to disconnect the drain electrode of the first MOS transistor to the source electrode of the first MOS transistor.

16. The alternating current to direct current converter system as claimed in claim 15, wherein the first charge and discharge module comprises a first capacitance, the first capacitance is charged by the current from the second MOS transistor when the second output end of the alternating current power supply outputs positive voltage.

17. The alternating current to direct current converter system as claimed in claim 16, wherein the first charge and discharge module further comprises a first resistance and a second resistance, a first end of the first capacitance connects to the drain electrode of the second MOS transistor and a first end of the first resistance, a first end of the second resistance connects to the second end of the first resistance and the gate electrode of the first MOS transistor, a second end of the second resistance connects to the second end of the first capacitance and the source electrode of the first MOS transistor.

18. The alternating current to direct current converter system as claimed in claim 17, wherein a third resistance connects between the first end of the first capacitance and the drain electrode of the second MOS transistor.

19. The alternating current to direct current converter system as claimed in claim 18, wherein the second charge and discharge module comprises a second capacitance, a fourth resistance and a third MOS transistor, the first end of the second capacitance connects to a first end of the fourth resistance, the first output end of the alternating current power supply of the alternating current power supply and the gate electrode of the third MOS transistor, the drain electrode of the third MOS transistor connects to the first end of the second resistance, the source electrode of the third MOS transistor connects to the second end of the second resistance, the second end of the second capacitance connects to the second output end of the alternating current power supply, a second end of the fourth resistance connects to second output end of the alternating current power supply.

20. The alternating current to direct current converter system as claimed in claim 18, wherein a third diode connects between the third resistance and the drain electrode of the second MOS transistor.

\* \* \* \* \*